Figure 1:
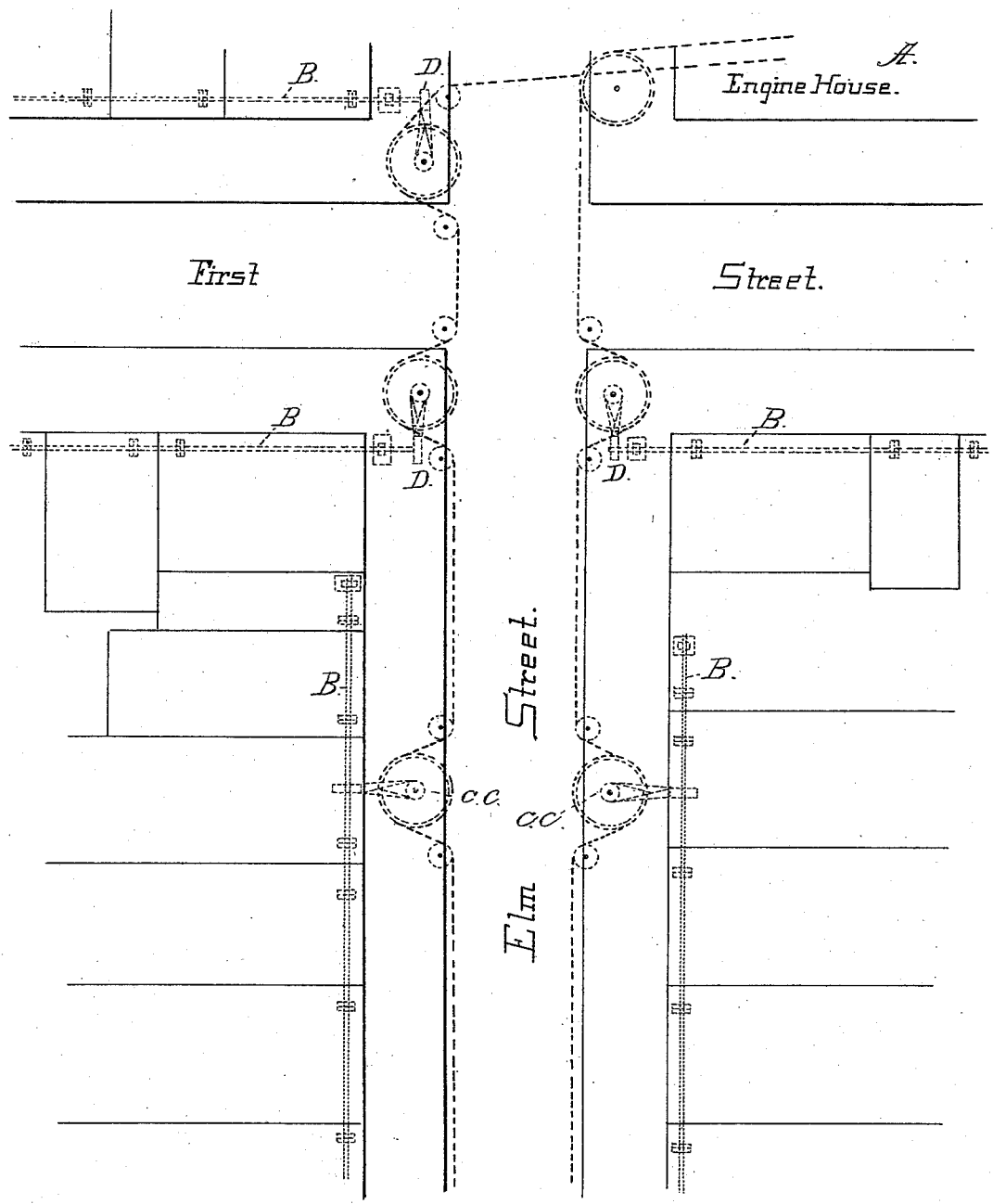

(No Model.) 2 Sheets—Sheet 2.
J. L. BOONE.
SYSTEM FOR TRANSMITTING POWER FROM A CENTRAL STATION.
No. 279,694. Patented June 19, 1883.
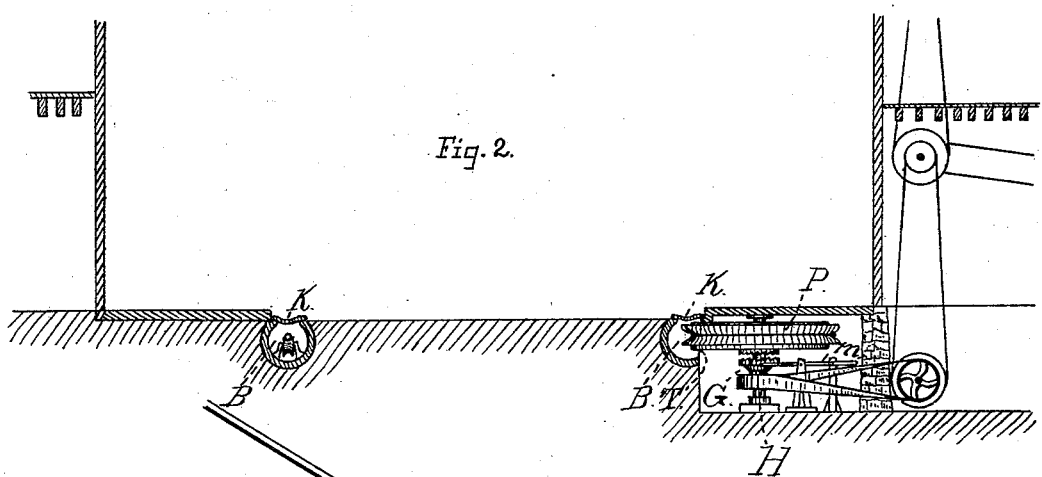
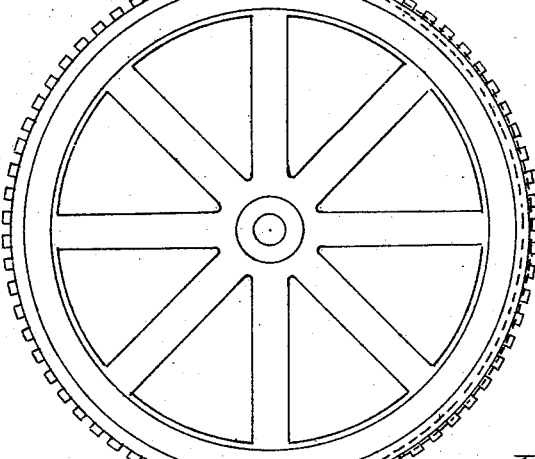
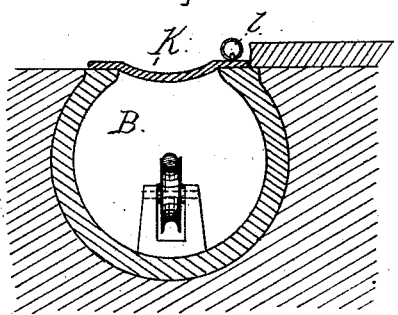
Witnesses:
Inventor:
John L. Boone
by Geo. W. Dyer atty

UNITED STATES PATENT OFFICE.

JOHN L. BOONE, OF SAN FRANCISCO, CALIFORNIA.

SYSTEM FOR TRANSMITTING POWER FROM A CENTRAL STATION.

SPECIFICATION forming part of Letters Patent No. 279,694, dated June 19, 1883.

Application filed May 18, 1883. (No model.)

*To all whom it may concern:*

Be it known that I, JOHN L. BOONE, of the city and county of San Francisco, in the State of California, have invented an Improved System for Transmitting Power from a Central Station for Driving Stationary Machinery; and I do hereby declare that the following is a full and correct description thereof.

My invention relates to a new and improved system by means of which factories, shops, and other places where power is required can be supplied with power from a central station; and it consists in the employment of an endless wire rope, chain, or cable, which is supported on pulleys in an underground tube or tunnel, and which is driven by power derived from a central station, so that the rope, chain, or cable will move continuously and transmit the power.

My invention contemplates the use of a system similar to that now in use for propelling cars along a track by means of an endless wire rope, chain, or cable moving in an underground slotted tube or tunnel, only I use it for driving stationary machinery at points along its line by means of suitable devices for taking the power from the moving rope or cable and transmitting it to the stationary machinery, and instead of constructing the tube through which the rope moves between two tracks I lead it in any direction under the surface of the ground, according to the manner and location of the points to which the power is to be supplied, and without regard to any tracks or other surface objects, except that in a city, where it is to be run through streets, I shall ordinarily construct the tube or tunnel close to the curbstone, out of the way and in a convenient position to connect with the stationary machinery, which is to be driven by the rope.

Referring to the accompanying drawings, Figure 1, Sheet 1, represents a plan of my system as applied in a city. Fig. 2, Sheet 2, is a section through the streets of a city. Fig. 3 shows a plan of the device for taking the power from the rope. Fig. 4 shows a section of the tube with its cover.

Let A represent a central station where power is generated.

B represents a tube or tunnel, which is constructed below the surface of the ground, and which is led in any required direction and its direction changed wherever it is required to change its direction, but finally leading back to the central station from whence it started.

Inside of the tube or tunnel, at proper distances apart—say twenty feet—I mount vertical pulleys C C, except at the angles where the direction of the tube changes, and here I use horizontal pulleys D. I then lay a wire rope, chain, or cable in the tube or tunnel, so that it will be supported upon the vertical pulleys and pass around the horizontal pulleys at the curves, and then I unite its two ends, so as to make it endless.

In the engine-house or central station, or at some other more suitable point on the line, I construct a take-up for the slack of the rope, which can consist of a weighted pulley or other suitable device for that purpose—such as is used in the cable system for propelling cars—thus securing a taut cable along the line. The cable is driven by an engine or other suitable power at the central station, so that it is kept continually moving. The tube or tunnel B, I construct with a slot on its upper side, in order to provide an opening for the passage of a bar or rod in laying the cable, as the cable has to be drawn through the tube by horses or other power; but this slot or opening is used for that purpose only, and is therefore kept constantly closed at other times, except when it becomes necessary to clean out the tube or repair the line. The tube or tunnel may be of any desired shape; but I prefer a cylindrical form as the best adapted for the purpose, and it need not usually be made so strong as that used in the system for propelling cars, as it can be placed in a less exposed and less traveled position. In a city I construct the tube along the edge of the sidewalk, just outside of the curbstone, and I carry it around corners and deflect it where desired by means of horizontal pulleys D, so as to best accommodate the users of power. When this is the case, I make the tube, as shown at Figs. 2 and 4, Sheet 2, with an open top, over which I place a cover, K, which is made concave in the form of a gutter, so that the cover will serve as a gutter for the street to carry off surface-water. This gutter plate or cover is removable, and I provide it with a ring, *l*, by means of which it can be raised and lifted off the tube when desired.

In order to take the power from the cable and transfer it to the stationary machinery, I shall usually employ what is known as a "grip-pulley," such as the Fowler (English) grip-pulley, or the one patented by Andrew S. Hallidie on the 22d day of February, 1870, as follows: At the point where the power is to be taken from the rope, I make a break or opening, T, in the tube or tunnel, or I construct a suitable chamber with which the tube will connect, so that the rope, chain, or cable can be deflected and be made to pass around one side of a grip-pulley, G, which is mounted on a shaft, H, in a suitable position in the opening or chamber. This pulley can be placed either vertical or horizontal; but I prefer to place it horizontally under the sidewalk, as shown at Fig. 2, Sheet 2. P is a horizontal pulley at the point where the rope is deflected, and it serves to keep the rope in line with the tube until it enters the opening or chamber. The pulley G, I mount loosely upon the shaft H, so that it will rotate upon and independent of the shaft H when it is desired to disconnect the power from the stationary machinery.

On the shaft H, I mount a sliding clutch, *m*, on a feather, so that it can be moved against the side of the pulley G and either engage it by friction or by means of clutches. I prefer a friction-clutch for ordinary use where the power to be deflected is not too great. This causes the shaft H to be rotated, and the power can be transferred from this shaft by belts and pulleys in the usual way, as shown at Fig. 2, Sheet 2.

Other devices might be used for taking the power from the rope and transferring it to the stationary machinery; but the above-described arrangement is simple and effective, and has the advantage of not materially deflecting the rope from its direct line of motion.

In this system I can use any number of branch or supplemental endless ropes, chains, or cables, and drive them all from a main cable, and at the same time supply power from all of them.

By means of this system I can supply power from a central station to any number of factories and shops along a line or in a specified district. The speed can be easily regulated as it is taken from the cable by means of differential pulleys, and the amount of power deflected at any point can be measured by a dynamometer.

The advantage of this system is that it supplies a noiseless power. It avoids the use of numberless boilers and engines in a city, thus materially decreasing the danger of fires and damage from smoke and soot. It also saves space and time to the persons who use the power.

Usually I will mount two ropes or cables on two independent sets of pulleys in the same tube, so that one can always be kept in reserve for use in case of accident to one of the cables.

If preferred, the endless chain or cable can be made with links, openings, or projections, so as to drive a cog-wheel; or the rope might be wrapped around a drum to transfer the power to the stationary machinery.

I am aware that an endless rope or cable moving in an underground slotted tube or tunnel has heretofore been used for propelling cars along a track in the streets of a city, and that such a rope has been made to drive pulleys for moving a supplemental chain along its line for carrying the cars around curves. This, therefore, I do not claim; but What I do claim, and desire to secure by Letters Patent, is—

1. The mode, method, or system of supplying power for driving stationary machinery by means of an endless moving wire rope, chain, or cable which is supported on pulleys in an underground tube or tunnel, said rope, chain, or cable being driven by power from a central station, substantially as described.

2. The improved system for transmitting power from a central station for driving stationary machinery, consisting of an endless wire rope, chain, or cable mounted on pulleys in an underground tube or tunnel, and driven by power derived from a suitable source at a central station, and suitable mechanism for taking the power from the rope, chain, or cable and transferring it to the stationary machinery, substantially as described.

3. The improved system of supplying and distributing power from a given point for driving stationary machinery at distant points, consisting of one or more endless cables driven by power derived from a main cable, all of said cables being inclosed in a continuous tube or tunnel, and suitable mechanism for deflecting and transferring power from any of said cables to stationary machinery on the line of the cables, substantially as herein specified.

4. The improved device for taking power from a moving rope and transferring it to machinery adjacent thereto, consisting of the pulley G, mounted loosely on the shaft H, and having the rope passed around or partially around the pulley, in combination with the sliding clutch *m* on the shaft H, substantially as specified.

5. In a system for transmitting and supplying power for driving stationary machinery in which an endless rope, chain, or cable is supported on pulleys in a tube or tunnel and driven by power derived from a central station, the break or chamber T in the tube, in combination with machinery located in said break or chamber, to which the power is transferred from the moving rope in its passage through the break or chamber, substantially as described.

6. In the system of transmitting power for moving machinery by means of a rope, chain, or cable supported on pulleys in a tube or tunnel, and driven by power from a central station, the tube having two independent sets of pulleys contained in it, on each of which sets of pulleys an independent rope, chain, or cable is mounted, so that either can be driven from the central station, substantially as described.

7. The tube or tunnel B, having an opening in its top, in combination with the gutter-shaped cover K, substantially as and for the purpose described.

8. The improvement in transmitting and supplying power for driving stationary machinery, consisting in mounting an endless moving rope, chain, or cable on pulleys in a tube or tunnel, which is provided with a slot or opening along its entire length, which slot or opening is covered and protected by a cover, K, which can be removed when desired, substantially as described.

In witness whereof I have hereunto set my hand and seal.

JOHN L. BOONE. [L. S.]

Witnesses:
 JOHN D. GAGNON,
 GEO. A. DICKSON.